United States Patent [19]
Nelson et al.

[11] Patent Number: 6,138,185
[45] Date of Patent: Oct. 24, 2000

[54] HIGH PERFORMANCE CROSSBAR SWITCH

[75] Inventors: Jeffrey J. Nelson, Louisville; Ken N. Jessop, Arvada, both of Colo.

[73] Assignee: McData Corporation, Broomfield, Colo.

[21] Appl. No.: 09/183,396

[22] Filed: Oct. 29, 1998

[51] Int. Cl.[7] .................................................. G06F 13/00
[52] U.S. Cl. ........................... 710/33; 710/33; 710/38; 710/131; 710/132
[58] Field of Search ........................... 710/31, 33, 38, 710/39, 131, 132; 340/825.79, 825.8, 825.83; 395/275, 325, 425, 550; 370/58.1

[56] References Cited

U.S. PATENT DOCUMENTS

| | | | |
|---|---|---|---|
| 3,597,738 | 8/1971 | Joslow et al. | 340/166 R |
| 4,605,928 | 8/1986 | Georgiou | 340/825.94 |
| 4,630,045 | 12/1986 | Georgiou | 340/825.79 |
| 4,635,250 | 1/1987 | Georgiou | 370/38 |
| 5,280,591 | 1/1994 | Garcia et al. | 395/325 |
| 5,392,422 | 2/1995 | Hoel et al. | 395/550 |
| 5,420,853 | 5/1995 | McRoberts et al. | 370/58.1 |
| 5,555,543 | 9/1996 | Grohoski et al. | 370/58.1 |
| 5,689,644 | 11/1997 | Chou et al. | 395/200.06 |
| 5,838,937 | 11/1998 | Lee et al. | 395/311 |
| 5,887,144 | 3/1999 | Guthrie | 395/281 |

*Primary Examiner*—Thomas C. Lee
*Assistant Examiner*—Chun Cao
*Attorney, Agent, or Firm*—Stuart T. Langley; William J. Kubida; Richard A. Bachand

[57] ABSTRACT

A switch having a plurality of input/output (I/O) ports and a crossbar device programmably coupling a first of the I/O ports with a second of the I/O ports. A plurality of port request controllers (PRCs) are coupled such that each PRC is associated with one of the I/O ports. A plurality of serial request busses are arranged such that each serial request bus couples each PRC with its associated port. A plurality of serial response busses are coupled such that each serial response bus coupling each PRC with its associated PRC. In operation, the serial request and response busses operate independently in a non-blocking fashion to process connection and clear requests in parallel.

24 Claims, 6 Drawing Sheets

HIGH PERFORMANCE CROSSBAR SWITCH

BACKGROUND OF THE INVENTION

1. Field of the Invention

The present invention relates, in general, to controllers for cross-point switches, and, more particularly, to methods and structures for high speed connection set up in a fibre channel switch.

2. Relevant Background

Fibre Channel is a high performance serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel a channel is established between two nodes where the channel's primary task is to transport data from one point to another at high speed with low latency, performing only simple error detection in hardware. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

To connect to a fibre channel fabric devices include a node port or "N_Port" that manages the fabric connection. The N_port establishes a connection to a fabric element (e.g., a switch) having a fabric port or "F_port". Devices attached to the fabric require only enough intelligence to manage the connection between the N_Port and the F_Port. Fabric elements include the intelligence to handle routing, error detection and recovery, and similar management functions.

A switch is a multi-port device where each port manages a simple point-to-point connection between itself and its attached system. Each port can be attached to a server, peripheral, I/O subsystem, bridge, hub, router, or even another switch. A switch receives a connection request from one port and automatically establishes a connection to another port. Multiple calls or data transfers happen concurrently through the multi-port Fibre Channel switch. A key advantage of switched technology is that it is "non-blocking" in that once a connection is established through the switch, the bandwidth provided by that connection is not shared.

Data connections in a fibre channel fabric tend to be short lived, hence, a switch that takes a long time to set up connections through a switch will severely limit the effective bandwidth of the switch. It typically requires a number of machine clock cycles to set up the connection after the connection request is made. From the time that a data connection is requested at one port until that connection is actually set up, no data can flow between the two affected ports.

In prior approaches, a multi-port switch processed connection requests from the various ports sequentially such that if one connection request is issued other subsequent connection requests would be blocked until the first connection request was processed. This approach used a common control bus shared by a plurality of ports to transport connection requests between the ports and the crossbar control logic. Because of this, a single failure could affect multiple ports. Also, connection setup was handled by a single pipeline that handled the connection requests for each of the ports. With up to 68 ports per switch (or more), latency caused by bus contention during the connection setup phase has become a significant bottleneck in overall throughput of the switch.

Another limitation of prior systems was that a port issuing a connection request had no knowledge about whether the destination port that it was attempting to reach was busy. Hence, the requesting port had to proceed through the entire connection request process, which could take multiple clock cycles, only to determine that the connection failed. However, the busy state of the destination port may have been set before the connection request process had begun. A need exists for communicating busy status of a port back to a port requesting a connection to the busy port so that the requesting port can abort or delay its request so as to lessen consumption of switch resources.

SUMMARY OF THE INVENTION

Briefly stated, the present invention involves a switch having a plurality of input/output (I/O) ports and a crossbar device programmably coupling a first of the I/O ports with a second of the I/O ports. A plurality of port request controllers (PRCs) are coupled such that each PRC is associated with one of the I/O ports. A plurality of serial request busses are arranged such that each serial request bus couples each PRC with its associated port. A plurality of serial response busses are coupled such that each serial response bus coupling each PRC with its associated PRC.

In another aspect, the present invention involves a method for controlling a crossbar switch coupled to a plurality of input/output (I/O) ports. A first connection request is generated in a first of the plurality of I/O ports and a second connection request is generated in a second of the plurality of I/O ports. The first and second connection requests are concurrently processed. The serial request and response busses operate independently in a non-blocking fashion to process connection and clear requests in parallel.

DETAILED DESCRIPTION OF THE PREFERRED EMBODIMENTS

Figure 1:
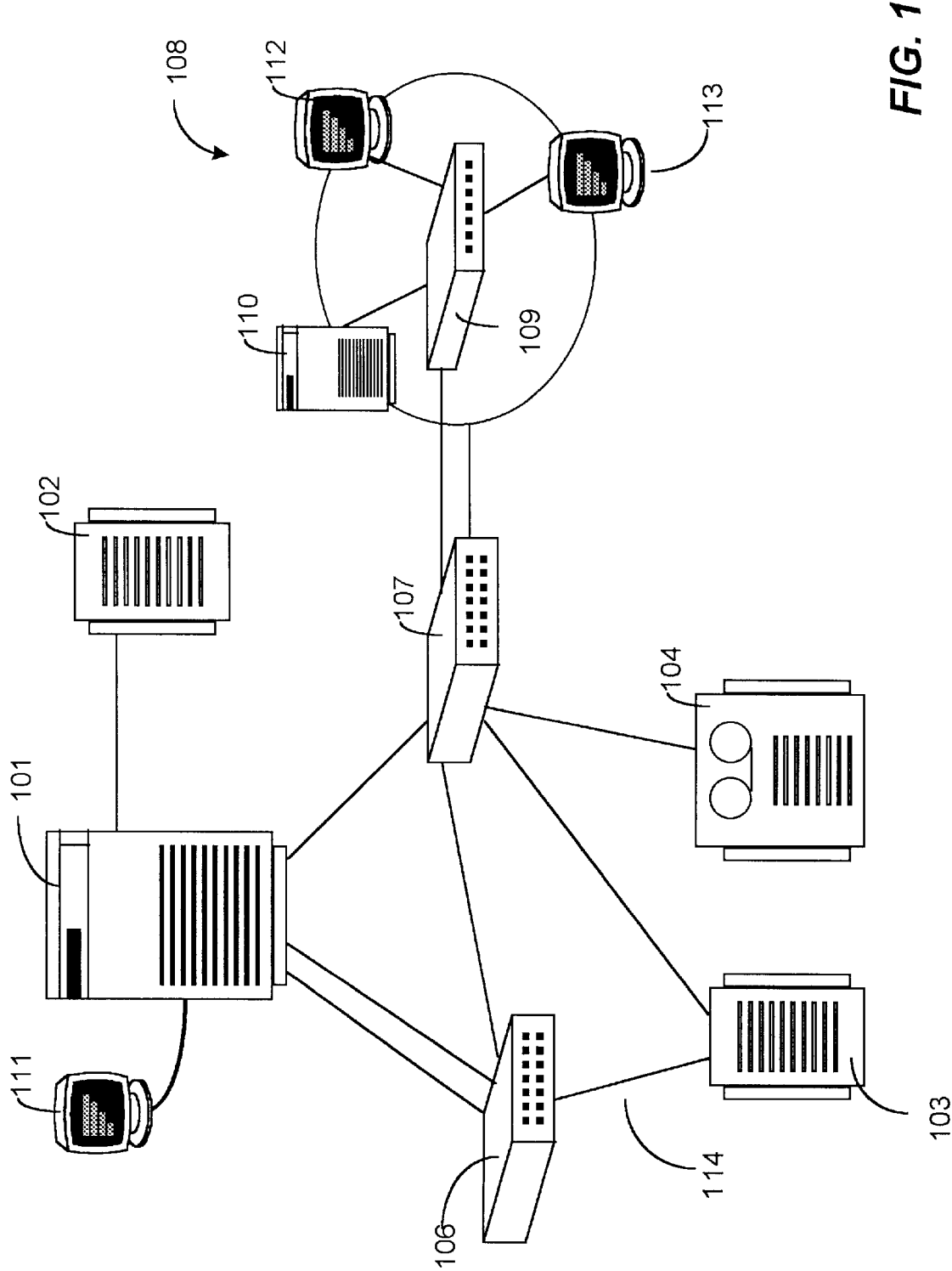
FIG. 1 shows a generalized fibre channel environment implementing the method and systems in accordance with the present invention.

FIG. 1 shows a generalized fibre channel environment implementing the method and systems in accordance with the present invention. FIG. 1 illustrates a number of devices and connections between the devices indicated by connecting lines. Each device includes one or more ports. In fibre channel, these ports are generally classified as node ports (N_Ports), fabric ports (F_Ports), and expansion ports (E_Ports). Node ports are located in a node device such as server 101, disk arrays 102 and 103, and tape storage device 104. Fabric ports are located in fabric devices such as switch 106 and switch 107. Optionally, a local area network, such as arbitrated loop network 108, can be linked to the fabric using fabric arbitrated loop ports (FL_Ports).

The devices shown in FIG. 1 are coupled by "links" indicated by lines. A channel can be established between two N_Ports using one or more links. For example, a direct or point-to-point channel is established using a single link such as the channel between server 101 and disk array 102 shown in FIG. 1. In this case, each N_Port manages the point-to-point connection between the other device's N_Port. A circuit-switched channel using multiple links can also be provided using a switch 106 or 107. For example, the N Port in server 101 can establish a channel with the N_Port of disk array 103 through switch 106. In this case, each N_Port makes a connection to an F_port in switch 106. Switch 106 also includes an expansion port or E_Port that enables a channel to another E_Port in switch 107. Using an inter-switch link (ISL) (i.e., a link that includes a switch) enables each N_Port to couple to each other N_Port in the fabric through one or more paths. Switch 107 also includes a fabric loop port (FL Port) that supports a link to arbitrated loop 108. In loop 108, hub 109 includes node loop ports (NL_Ports) supporting links to loop server 110 and workstations 112 and 113 as well as an FL_Port supporting a link to switch 107. Devices 111, 112, and 113 represent user terminals, personal computers, or workstations coupled to the fabric through a conventional direct or network connection.

Figure 2:
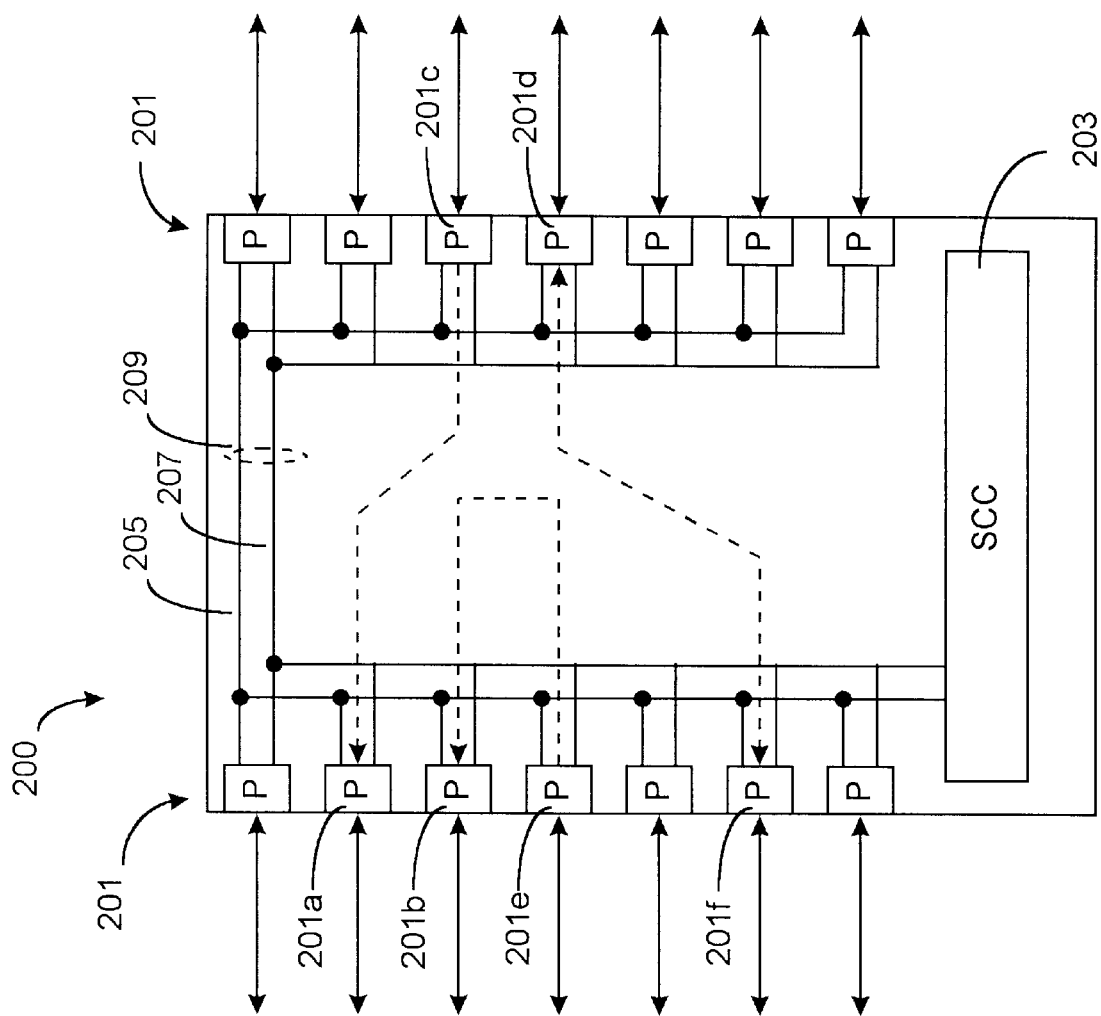
FIG. 2 shows in block diagram form a switch implementing the method and apparatus in accordance with the present invention.

FIG. 2 shows a particular switch 200 embodying the high performance crossbar switching method and apparatus in accordance with the present invention. Each port 201 (labeled P in FIG. 2) is an input/output (I/O) port that supports bi-directional data communication with external devices. Each port contains transmit and receive circuitry (not shown) of any available design and technology. However, switch 200 could be equivalently configured with a plurality of dedicated input ports and a plurality of dedicated output ports for purposes of the present invention.

Switch 200 includes a configurable crossbar device, illustrated diagrammatically by dashed lines, that programmably couples any one of the ports to any other of the ports. The crossbar device is preferably a full crossbar, but partial crossbar devices may be equivalently substituted with a predictable impact on performance without departing from the teachings of the present invention. The connections may be uni-directional (i.e., half duplex) or bi-directional (i.e., full duplex), as suggested by the arrowhead directions in FIG. 2, to meet the needs of a particular application. A port that receives external data is referred to as a "source port" while a port that transmits data to an external destination is referred to as the "destination port". Hence, a connection is made within switch 202 from a source port to a destination port. Example connections in FIG. 2 are illustrated by dashed lines between ports with the arrowhead pointing at the destination port.

Serial crossbar controller (SCC) 203 is operatively coupled to each port by a plurality of independent connection busses 209 including a request portion 205 and a response portion 207. Request portion 205 comprises a plurality of independent serial request busses each comprising a connection line coupling one port 201 to one PRC 305. Similarly, response portion 207 comprises a plurality of independent serial response busses each comprising a connection line coupling one PRC 305 to one port 201. As described in greater detail below, because each serial request bus and each serial reply bus are independent, requests and responses can be processed concurrently to reduce latency. The term "concurrently" as used herein means "processed during a single clock cycle". In other words, concurrent requests are processed in a non-blocking manner such that a pending request does not block the issue and processing of other requests from either the port 201 generating the pending request, or other ports 201 in the switch 200. Requests that cannot be established are handled in parallel and so will not consume connection bus bandwidth that prior sequential connection bus implementations incurred.

SCC 203 receives connection requests from each of ports 201 and program the configurable connections in the crossbar device. In operation, a source port receives a data packet from an external device. Logic within each port detects that the received data requires a connection set up and makes a connection request on request bus 205 to SCC 203. SCC 203 will respond on response bus 207 with connection status information indicating that a connection can be made or that a connection cannot be made. In accordance with the present invention, more than one port can receive a connection request at any given time hence SCC 203 desirably processes connection requests concurrently (i.e., in parallel) for low latency performance.

Figure 3:
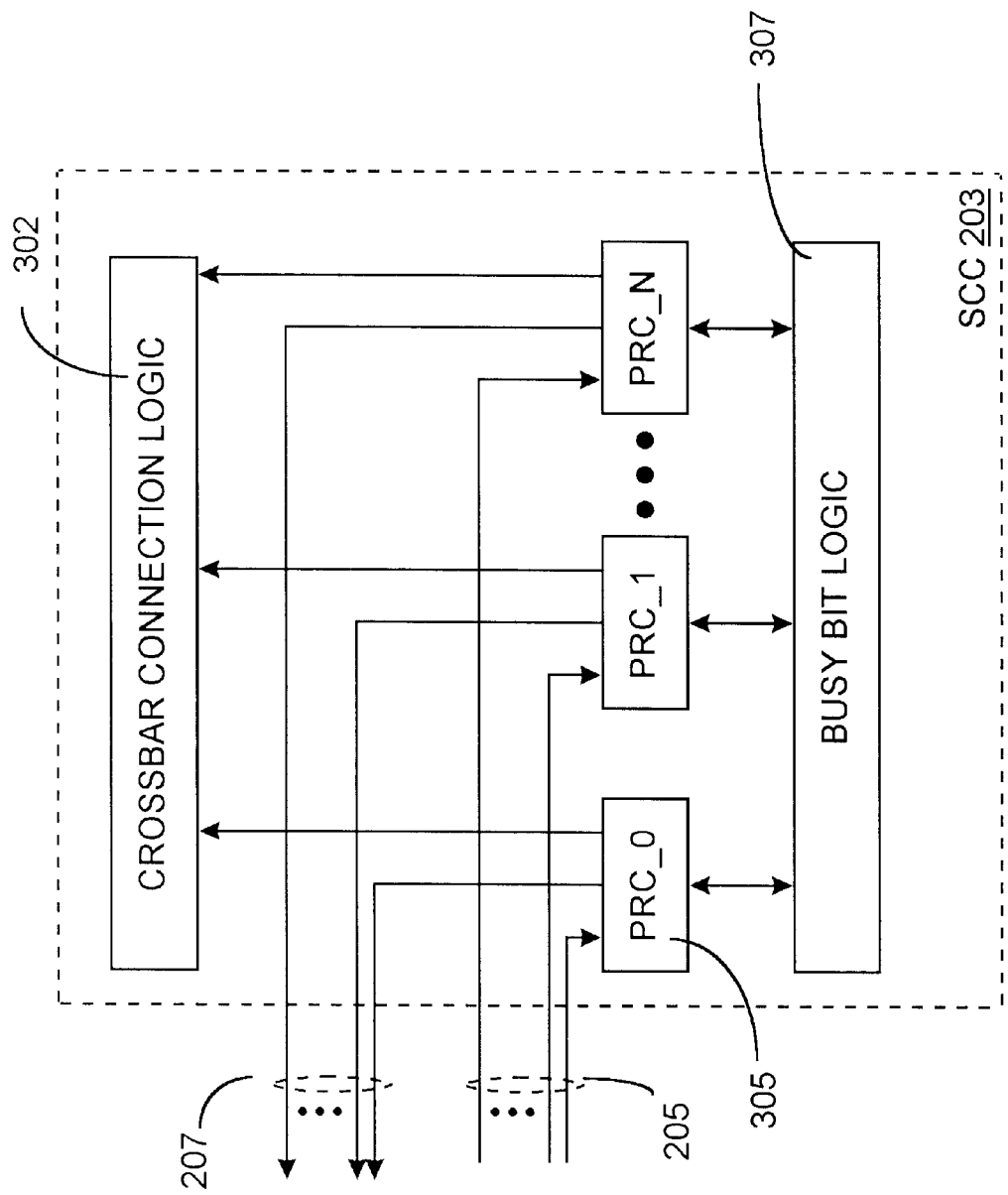
FIG. 3 illustrates a serial crossbar controller in accordance with the present invention in greater detail.

FIG. 3 illustrates major components of SCC 203 in block diagram form. The request portion 205 of connection bus 209 (shown in FIG. 2) includes a plurality of connection lines where each connection line is a serial request bus 205 that makes a point-to-point connection between one of the ports 201 (shown in FIG. 2) and one port request controller (PRC) 305. SCC 203 includes one PRC 305 (labeled PRC_0 through PRC_N for an switch having N I/O ports) for each port 201 in the preferred embodiment. In practice the SCC 203 includes additional logic, memory and signal processing devices for performing any number of conventional port management functions. These additional logic devices are not shown to aide understanding of the features and operation of the present invention.

Each PRC 305 receives a serial bit stream on one (or more than one in the case of concurrent requests) of the connection lines within the request portion 205 of connection bus 209 (shown in FIG. 2). Each PRQ 305 is dedicated to managing port connections for a single port 201 and is configured to process the serial bit streams to perform connection setup between individual ports 201. A request can be of several types as defined by a particular application. In an exemplary implementation, a request comprises encoded information representing four different request types: a "clear only", "connect full duplex", "connect half duplex with clear", and a "connect half duplex without clear" request. Each PRC 305 scans the connection lines of the request bus 205 to detect an active request. When a request on request bus 205 is detected by a particular PRC 305, the PRC 305 decodes the request type and verifies the request's check bit.

Busy status of the transmit section 303 is maintained for each individual port 201 by busy bit logic 307. Busy bit logic 307 is essentially a plurality of state machines where each state machine holds a clear or busy status of the associated port transmitter. In a typical implementation, busy bit logic 307 is a centralized memory array having entries for each port 201 in switch 200. For each port 201, the associated busy bit logic accepts requests from each other port 201 over request bus 205 and transmits a response on response bus 207 indicating its state to the requesting PRC 305.

A port is busy if its transmitter is in use and is otherwise available. Busy bit logic 307 includes interface logic for receiving request messages from PRCs 305 and sending reply messages to appropriate PRCs 305. The interface logic of busy bit logic 307 is point-to-point allowing multiple requests to either the same port 201 or different ports 201 to occur simultaneously. When multiple connections occur to different ports the respective PRQs 305 then arbitrate to the crossbar connection logic (CCL) 302 to establish a connection.

Connection setup in the CCL consumes many clock cycles and arbitration between ports contending for the same connection resources can add further latency. In a preferred implementation, busy bit logic 307 includes devices to determine if the requesting port was last connected to the destination. Each PRC 201 is aware of whether it was the last port to request connection to the destination port specified in the request (i.e., whether a connection remains set up to the requested destination port). In such a case, the already established crossbar connection can be used and a new crossbar connection need not be made and efficiency is increased.

Figure 4:
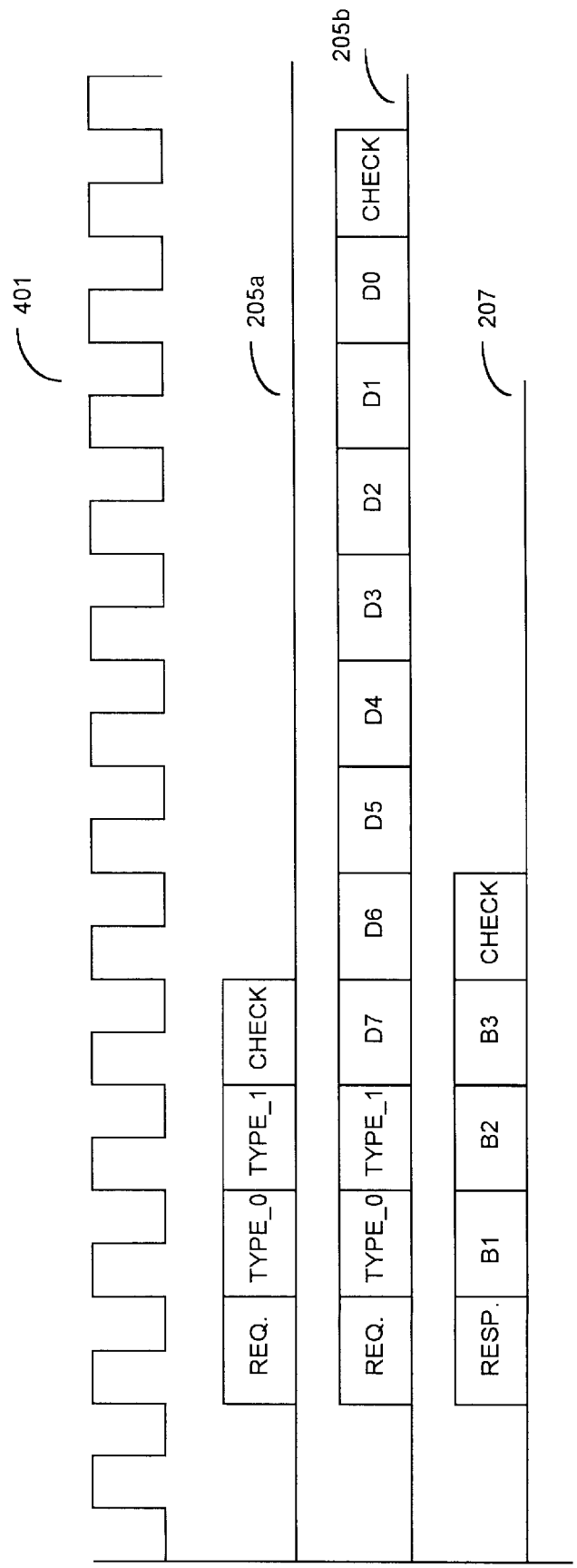
FIG. 4 shows a timing diagram illustrating serial request and response messages in accordance with the present invention.

FIG. 4 shows exemplary serial connection messages passed on the connection bus 209. No mandatory timing relationship is implied between the connection and response busses depicted in FIG. 4. In other words, FIG. 4 shows two concurrent request messages together with a concurrent response message, but these messages are in operation asynchronous with respect to each other and may or may not occur concurrently. Each connection line in request bus 205 and response bus 207 can support only one message at a time, however, any number of connection lines may be carrying messages at any given time.

A system clock signal 401 is coupled to each PRC 305 and each port 201. In a particular example system clock signal 401 is a 53 MHz signal. FIG. 4 shows two different requests types on horizontal lines labeled 205a and 205b to indicate that the requests shown in FIG. 4 are asserted on one of the connection lines in request bus 205. Similarly, FIG. 4 shows one reply message on the horizontal line labeled 207. In the particular example, all responses have the same message format and so only a single response message need be illustrated and described. However, the present invention is readily adapted to accommodate varying response messages that may include more than one response message type.

On a request bus 205, the connection line state (i.e., active or inactive) for the next two clock cycles (labeled TYPE_0 and TYPE_1 in FIG. 4) indicates an encoding that identifies the actual request type. This arrangement enables four possible request types, and more clock cycles may be used to provide a greater number of encodings so as to indicate a wider variety of request types. Table 1 shows an exemplary encoding of request types and assigned bit values in the request message. It should be understood that the encoding assignments shown in Table 1 are examples only, and that other encoding assignments using more or fewer bits could be equivalently substituted in accordance with the present invention.

TABLE 1

| Request BITS | | |
| --- | --- | --- |
| TYPE 0 | TYPE 1 | ENCODED REQUEST TYPE |
| 0 | 0 | Clear only |
| 0 | 1 | Clear and Connect Half Duplex |
| 1 | 0 | Connect Half Duplex Only |
| 1 | 1 | Connect Full Duplex |

In FIG. 4, the request on line 205a comprises a clear-only type request that directs the receiving PRC 305 to clear the busy bit of the associated portion of busy bit logic 307 (i.e., indicate availability of the port 201 issuing the clear request. For the clear-only request on line 205a, the connection line is set inactive during both the phase labeled TYPE_0 and TYPE_1 in FIG. 4. In the particular implementation, the clear-only request type on line 205a requires only four clock cycles. In the first clock cycle the logic signal on line 205a is set in an active state to indicate a request is being asserted. The associated PRC 305 scans each of the connection lines to which it is coupled at least once every clock cycle to detect any connection lines that are active.

The clear request directs the receiving PRC 305 to clear the busy bit associated with its own port so no additional data is needed. As shown, the clear message includes a CHECK bit added during the third clock cycle after the REQUEST bit is set active. The CHECK bit is used for error detection. Although only a single CHECK bit is used in the particular example, more than one CHECK bit can be used to enable error detection/correction using available error detection/correction algorithms to meet the needs of a particular application. In this manner a clear request message can be communicated in four clock cycles. The TYPE_0, TYPE_1, CONNECT, and CHECK bits can be equivalently placed in any location in the request message.

The connect request shown on line 205b illustrates the timing for Clear and Connect Half Duplex, Connect Half Duplex Only, and Connect Full Duplex request types. The TYPE_0, TYPE_1 and CHECK bits serve the same function as in the clear-only message shown on line 205a. In a request message that requires a connect, also called a "connect message", however, the TYPE_0 and TYPE_1 bits are set appropriately to indicated the desired request type as shown in Table 1. A connect message includes a number of bits (e.g., bits D0–D7) indicating a destination port to which a connection is to be made. Any number of data bits may be included to accommodate the available number of ports. For example, eight bits as shown in FIG. 4 allows $2^8$ or 256 ports to be identified in the connect message. In this manner, a serial connect message requesting a connection between a port and any of 256 other ports can be communicated in twelve clock cycles.

Line 207 in FIG. 4 shows an exemplary serial response message. In the particular example, each response includes five bits-a first bit that signals a response line is active, three data bits, and a check bit. PRC 305 indicates a response by setting line 207 active for one clock cycle during the RESPONSE phase. The three clock cycles following the RESPONSE phase indicate the status of a connection request. Three response bits allow $2^3$ unique response states. Table 2 shows an exemplary encoding of response states and assigned bit values in the response message. It should be understood that the encoding assignments shown in Table 2 are examples only, and that other encoding assignments using more or fewer bits could be equivalently substituted in accordance with the present invention. The response message desirable includes a CHECK bit that operates in a manner similar to the CHECK bit in request messages described hereinbefore.

TABLE 2

| RESPONSE BITS | DEFINITION |
| --- | --- |
| 000 | Connected as a Destination Port Half Duplex |
| 001 | Connected as a Source Port Half Duplex |
| 010 | Connected as a Source and Dest. Port Half Duplex |
| 011 | Connected as a Source Port Full Duplex |
| 100 | Connected as a Destination Port Full Duplex |
| 101 | Requested Destination Port is Busy and Connected as Destination Port Half Duplex |
| 110 | Requested Destination Port is Busy |
| 111 | Source Port is Busy |

Figure 5:
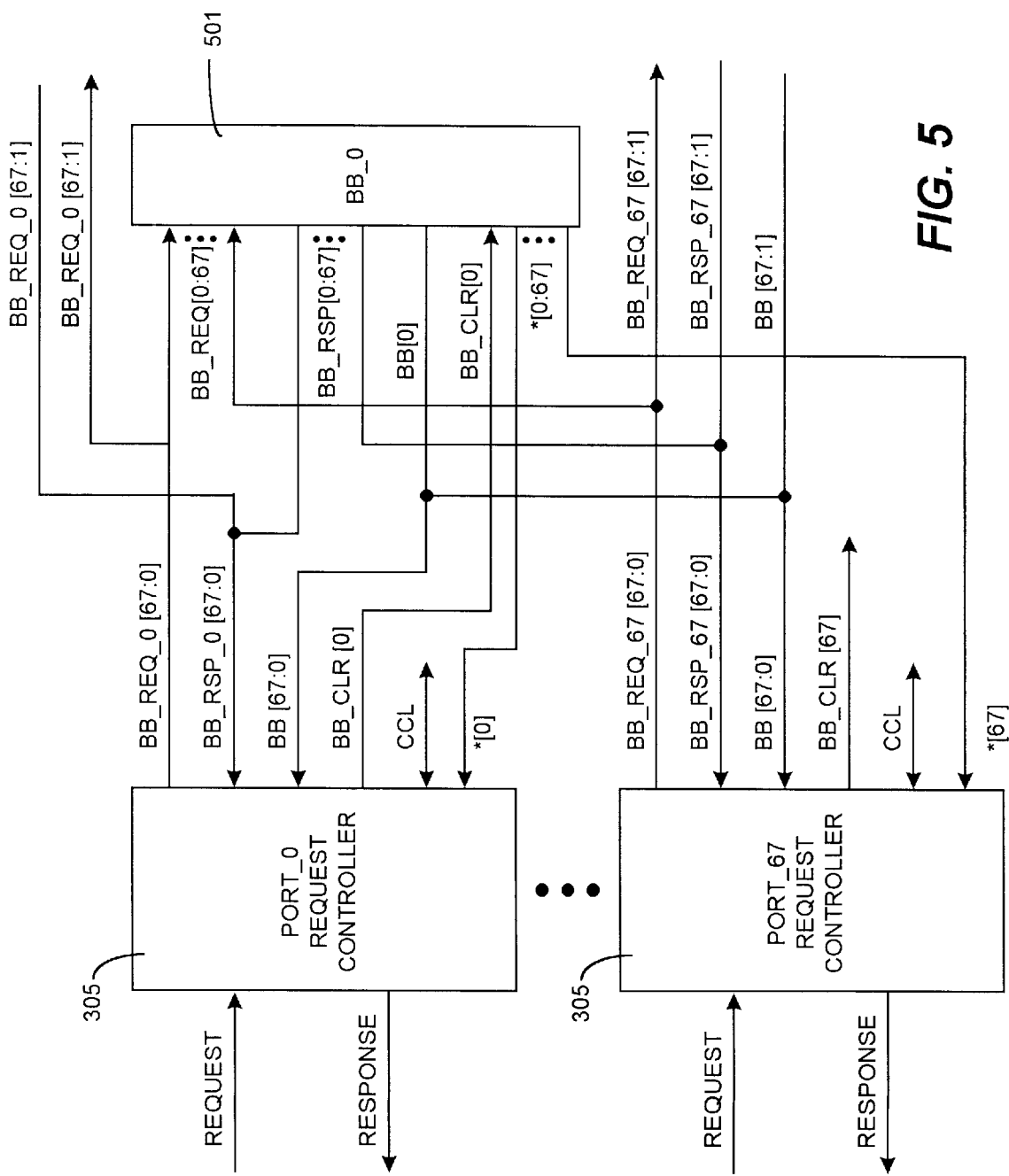
FIG. 5 shows a specific implementation of port and busy bit logic in accordance with the present invention.

A more complete understanding of SCC 203 is possible with reference to a specific 68-port implementation shown in FIG. 5. FIG. 5 shows only a portion of a 68 port device that would include 68 PRCs 305 as well as 68 busy bit segments 501 within busy bit unit 307. Each PRC 305 is associated with one port 201 (shown in FIG. 2). Similarly, each busy bit segment 501 is associated with one port 201.

Each PRC 305 includes a connection to the crossbar connection logic 302 (shown in FIG. 3) that is one or more bits wide to meet the needs of a particular application. Preferably, each PRC 305 makes a multi-line parallel connection to CCL 302 using any available crossbar addressing technique.

Each PRC 305 includes a single busy bit clear (BB_CLR) line that is coupled to the busy bit segment 501 associated with that port. Port availability is indicated by clearing the busy bit by asserting an active signal on the BB_CLR line. When the request detected by PRC 305 is a request to clear its own busy bit, the PRC 305 asserts a busy bit clear (BB_CLR) signal after checking the request message's validation bit. Once the busy bit is clear, the port 201 is available to serve as a destination port for other connections.

For any connection request, PRC 305 decodes the destination port number from the serial bit stream of the connection request and validates the check bit. If PRC 305 determines that the request is valid, PRC 305 attempts to obtain control of the designated destination port by asserting an active signal on one of the BB_REQ lines. The BB_REQ bus comprises 68 connection lines (BB_REQ [67:0]) in the 68-port example of FIG. 5. Each BB_REQ line couples one PRC 305 (e.g., Port_0 Request Controller 305 in FIG. 5) with each busy bit segment 501 (e.g., BB_0 through BB_67). In a particular implementation, PRC 305 asserts the decoded destination port's BB_REQ signal for a single clock period as shown in FIG. 4.

Each busy bit segment 501 includes a BB_REQ interface to receive the BB REQ signal from each of the PRCs 305. Each busy bit segment 501 also includes a response line (e.g., BB_RSP[0]–BB_RSP[67]) coupled to each PRC 305 as well as a single busy bit line (e.g., BB[0]) that is fanned out to each PRC 305. In this manner, each PRC 305 is continuously aware of the busy/available status of each busy bit segment 501, and so aware of the availability of each port 201. A PRC 305 that issues a request does not have to wait for the addressed busy bit segment 501 to respond. However, even though the PRC 305 is aware of the busy/available state before sending asserting a signal on the BB_REQ line, the BB_REQ signal is asserted in an unchecked manner to avoid any latency associated with blocking the BB_REQ signal while evaluating the busy/available state of the destination port.

At the end of a connection request message the PRC 305 receiving the connection request scans the appropriate BB line (i.e., one of lines BB[67:0] in FIG. 5) and its BB_RSP lines (i.e., one of the lines BB_RSP[67:0] in FIG. 5). If either the BB is set or the BB_RSP is not set for the requested destination port, then a connection cannot be made and PRC 305 generates a destination port busy message back to the requesting port 201. If a connection is established (i.e., the BB is clear and the BB_RSP is set) then the requesting PRC 305 generates a switch request to CCL 302 and an appropriate response message back to the requesting port 201.

An optional and preferred implementation minimizes the generation of switch requests to CCL 302 by including contain "last connected port" information in busy bit logic segment 501. Each busy bit logic segment 501 includes a line labeled *[0–67] in FIG. 5 that indicates to the associated PRC 201 that a connection is already set up by CCL 302 as a result of a prior connection request. When a connection is granted to a requesting port the indication on the * line is used to determine if the crossbar is already configured or if re-configuration is required. When re-configuration is not required, the requesting PRC 201 is able to bypass the step of generating a switch request to CCL 302.

As an optional feature, the present invention is readily adapted to support broadcast and multicast groups. In broadcast and multicast, a single source port 201 may request a connection to multiple destination ports 201 as each destination port 201 is intended to receive the same data. Prior switch implementations that set up connections one at a time have added undesireable latency to multicast and broadcast implementations.

In an exemplary implementation, a portion of the destination port address space (e.g., the address space defined by the 8-bits D0–D7 in FIG. 4) is reserved to indicate multicast/broadcast groups. Alternativly, multicast/broadcast requests can be designated as specific request types such as those shown in Table 1 and allocated a unique encoding. In a particular implementation, a connect request message including a destination port address in the range of hex "0xF0" to hex "0xFF" identifies a multicast or broadcast connection.

Figure 6:
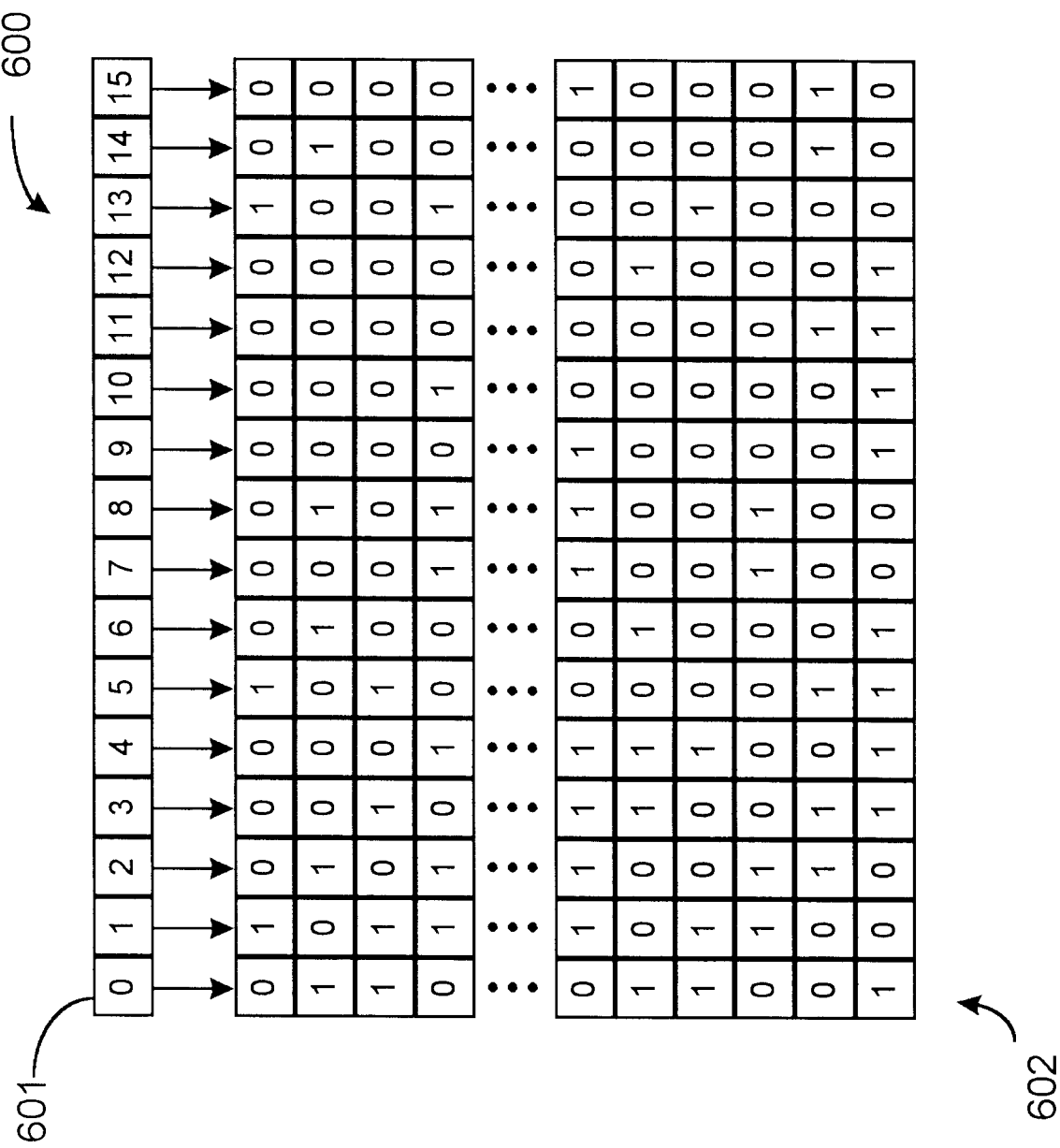
FIG. 6 shows an example configuration mechanism for processing multicast and broadcast requests in accordance with an embodiment of the present invention.

FIG. 6 shows an example configuration mechanism that can be implemented in each PRC 305 or in a centralized multicast unit (not shown) that handles multicast configuration. A system administrator (manual or automated) pre-configures a switch 200 to define sixteen multicast/broadcast groups or sets. Each multicast/broadcast group is associated with an entry 601 in a configuration register 600. Each group or set corresponds to one of the sixteen addressess in the range of hex "0xF0" to hex "0xFF". Each multicast/broadcast group comprises a set of destination ports that can be concurrently connected to a single requesting source port. Port assignment to a multicast/broadcast group are typically done to meet specific requests of devices and users of the particular ports within a multicast/broadcast group.

Each entry 601 in configuration register 600 holds an enable bit in the preferred implementation so that the system administrator can selectively enable each multicast/broadcast group independently. For example, a logic "HIGH" stored in an entry 601 enables that multicast/broadcast group whereas a logic "LOW" disables that multicast/broadcast group. By disabling a particular entry 601 the corresponding address (i.e., an address in the range "0xF0 to 0xFF" can be used as a conventional unicast address.

A bit mask 602 is readily used to identify group members. A bit mask 602 is associated with each entry 601, and hence associated with each multicast/broadcast group. Bit mask 602 includes an entry for every port 201 in switch 200 that can be included in a multicast/broadcast group (e.g., up to 68 entries for a 68-port switch, or up to 256 entries for a 256-port switch). Each entry corresponds to one of the switches ports and comprises a one-bit identifier indicating whether the corresponding switch port is or is not included in the particular multicast/broadcast group.

A requesting PRC 201 generates connect requests to each of the destination ports identified by bit mask 602. The multiple parallel connection requests use the same mechanisms and protocols discussed hereinbefore with respect to unicast connections. Because the present invention includes independent request/response resources for every port, the multiple requests are processed concurrently resulting in a plurality of responses on the BB, BB_RSP and * that indicate availability status of the requested ports.

In many instances not all of the requested destination ports will be available. This is acceptable under the fibre channel multicast/broadcast specification in that multicast/broadcast channels are of a type where packets may be dropped or discarded if a connection cannot be established (e.g., class 2 or class 3 service). The requesting PRC 305 initiates switch requests with CCL 302 to set up the connection(s) to available destination ports 201 and generates a message back to the port 201 associated with the requesting PRC 305 indicating which of the destination ports in the multicast/broadcast request were successfully arbitrated for.

Because the present invention enables multiple concurrent connection requests to be processed, latency associated with multicast and broadcast connection setup is greatly reduced. For any multicast or broadcast group the requests are all performed within the same arbitration window with the available member ports being latched for the crossbar connection logic 203.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A switch comprising:
    a plurality of input/output (I/O) ports;
    a crossbar device programmably coupling a first of the I/O ports with a second of the I/O ports;
    a plurality of port request controllers (PRC's) wherein each PRC is associated with one of the I/O ports;
    a plurality of serial request busses, wherein each serial request bus couples each PRC with its associated port; and
    a plurality of serial response busses wherein each serial response bus couples each port with its associated PRC.

2. The switch of claim 1 further comprising a busy bit logic unit comprising storage for holding busy status information on a port-by-port basis.

3. A switch comprising:
    a plurality of input/output (I/O) ports;
    a crossbar device programmably coupling a first of the I/O ports with a second of the I/O ports;
    a plurality of port request controllers (PRC's) wherein each PRC is associated with one of the I/O ports;
    a plurality of serial request busses, wherein each serial request bus couples each PRC with its associated port;
    a plurality of serial response busses wherein each serial response bus couples each port with its associated PRC; and
    a last connected port mechanism associated with each I/O port comprising storage for holding an identifier of one of the I/O ports to which the associated I/O port was last connected.

4. The switch of claim 2 wherein the busy bit logic comprises:
    a request interface for receiving connection requests on a port-by-port basis;
    a response interface for issuing responses to connection requests on a port-by-port basis; and
    a status interface for providing current availability status on a port-by-port basis to each of the plurality of PRCs.

5. A switch comprising:
    a plurality of input/output (I/O) ports;
    a crossbar device programmably coupling a first of the I/O ports with a second of the I/O ports;
    a plurality of port request controllers (PRC's) wherein each PRC is associated with one of the I/O ports;
    a plurality of serial request busses, wherein each serial request bus couples each PRC with its associated port;
    a plurality of serial response busses wherein each serial response bus couples each port with its associated PRC;
    a busy bit logic unit comprising storage for holding busy status information on a port-by-port basis wherein the busy bit logic unit further comprises a last connected port interface for providing information on a port-by-port basis to each of the plurality of PRCs about the I/O port that was last connected to the port associated with the PRC.

6. The switch of claim 4 wherein each PRC comprises:
    a port interface coupled to the serial request bus and the serial response bus;
    a request interface for sending connection requests to the request interface of the busy bit logic;
    a response interface for receiving responses to connection requests from the response interface of each busy bit logic unit; and
    a status interface for receiving current availability status on a port-by-port basis from the busy bit logic unit.

7. The switch of claim 1 wherein the crossbar device programmably couples a first of the I/O ports to any of the other I/O ports specified by the first I/O port.

8. The switch of claim 1 wherein the crossbar device programmably couples a first of the I/O ports to a set of the other I/O ports, wherein the set of the other I/O ports is specified by the first I/O port.

9. The switch of claim 1 wherein the serial request bus operates independently of the serial response bus.

10. A method for controlling a cross bar switch comprising the steps of:
    providing a plurality of input/output (I/O) ports;
    generating a first connection request in a first of the plurality of I/O ports;
    generating a second connection request in a second of the plurality of I/O ports; and
    concurrently processing the first and second connection requests.

11. The method of claim 10 wherein the step of concurrently processing further comprises the step of:

generating a response to the first connection request after the step of generating the second connection request.

12. The method of claim 11 further comprising the step of generating a third connection request in the first of the plurality of I/O ports before receiving the response to the first connection request.

13. The method of claim 10 wherein the connection requests are asynchronous with respect to each other.

14. The method of claim 11 wherein the connection requests and responses are generated in a non-blocking manner.

15. The method of claim 10 further comprising the step of:

generating a signal in response to the first connection request indicating whether a connection is already set up in the crossbar switch that would satisfy the first connection request; and using the connection that is already set up to satisfy the first connection request.

16. The method of claim 10 wherein the first connection request identifies a plurality of I/O ports that are destination ports for the connection request, the method further comprising a step of:

concurrently determining availability of each of the destination ports identified in the first connection request.

17. The method of claim 16 wherein the first connection request comprises a request to establish a multicast connection between the first port and the plurality of destination ports.

18. The method of claim 16 wherein the first connection request comprises a request to establish a broadcast connection between the first port and the plurality of destination ports.

19. A controller for a crossbar switch for connecting a first port to at least one other port in response to a request generated by the first port, the controller comprising:

a serial request bus coupled to the first port to transport the request;

a port request controller (PRC) associated with the first port and coupled to the serial request bus to receive the request; and a first busy bit logic section associated with the first port and each other port and coupled to the PRC to indicate availability status of the destination.

20. The controller of claim 19 further comprising:

a second busy bit logic section associated with the at least one other port, the second busy bit logic section coupled to the PRC to indicates availability of the associated port.

21. The controller of claim 19 further comprising a serial response bus coupled to the source port and the PRC to communicate port availability status.

22. A controller for a crossbar switch for connecting a first port to at least one other port in response to a requested generated by the first port, the controller comprising:

a serial request bus coupled to the first port to transport the request;

a port request controllers (PRC) associated with the first port and coupled to the serial request bus to receive the request;

a first busy bit logic section associated with the first port and each other port and coupled to the PRC to indicate availability status of the a destination; and a last connected port bus coupled to the PRC and each other port to indicate any of the other ports that was last connected to the source port.

23. A communication system comprising:

a plurality of network devices, each device having a node for communicating with external devices;

a switch having a plurality of input/output (I/O) ports;

a communication channel coupling each of the plurality of nodes to one of the I/O ports of the switch;

a crossbar device within the switch operable to programmably couple a selected source I/O port with a selected destination I/O port;

a plurality of port request controllers (PRCs) wherein each PRC is associated with a selected one of the I/O ports;

a plurality of serial request busses, wherein each serial request bus couples a selected one PRC with its associated port; and a plurality of serial response busses wherein each serial response bus couples a selected one port with its associated PRC.

24. The communication system of claim 23 wherein the destination I/O port is selected based upon a connection request communicated on one of the serial request busses.

* * * * *